United States Patent
Henwood

(10) Patent No.: US 8,047,312 B2
(45) Date of Patent: Nov. 1, 2011

(54) STEAMOLINE: A GAS-ELECTRIC-STEAM POWER HYBRID AUTOMOBILE

(75) Inventor: Kevin Sebastian Henwood, San Luis Obispo, CA (US)

(73) Assignee: Kevin Sebastian Henwood, San Francisco, CA (US)

( * ) Notice: Subject to any disclaimer, the term of this patent is extended or adjusted under 35 U.S.C. 154(b) by 0 days.

(21) Appl. No.: 12/624,394

(22) Filed: Dec. 18, 2009

(65) Prior Publication Data

US 2010/0229554 A1    Sep. 16, 2010

(51) Int. Cl.
  *B60K 6/46*    (2007.10)
(52) U.S. Cl. .............. 180/65.245; 180/304; 180/303
(58) Field of Classification Search .......... 180/65.245, 180/304, 65.8, 65.27, 65.28, 65.25, 65.285, 180/65.29, 303; 429/12, 13, 19, 33
See application file for complete search history.

(56) References Cited

U.S. PATENT DOCUMENTS

| | | | |
|---|---|---|---|
| 3,758,836 A * | 9/1973 | Shibata | 318/732 |
| 3,791,473 A * | 2/1974 | Rosen | 180/65.26 |
| 3,796,278 A * | 3/1974 | Shibata | 180/65.245 |
| 3,889,127 A * | 6/1975 | Shibata | 290/14 |
| 3,904,883 A * | 9/1975 | Horwinski | 180/65.25 |
| 4,300,353 A * | 11/1981 | Ridgway | 60/618 |
| 4,311,010 A * | 1/1982 | Wurmfeld | 60/641.8 |
| 4,509,464 A * | 4/1985 | Hansen | 123/1 A |
| 5,385,211 A * | 1/1995 | Carroll | 180/65.245 |
| 5,522,368 A * | 6/1996 | Tusino | 123/522 |
| 6,007,443 A * | 12/1999 | Onimaru et al. | 180/65.25 |
| 6,035,637 A * | 3/2000 | Beale et al. | 60/595 |
| 6,116,363 A * | 9/2000 | Frank | 180/65.25 |
| 6,380,637 B1 * | 4/2002 | Hsu et al. | 429/12 |
| 6,397,962 B1 * | 6/2002 | Bllau | 180/65.23 |
| 6,450,283 B1 * | 9/2002 | Taggett | 180/304 |
| 6,649,289 B2 * | 11/2003 | Hsu et al. | 429/13 |
| 7,002,121 B2 * | 2/2006 | Monteleone et al. | 219/688 |

* cited by examiner

*Primary Examiner* — Hau Phan

(57) ABSTRACT

A much more fuel-efficient automotive vehicle can be made utilizing an internal combustion engine paired to a conventional piston-type steam engine. There is a gasoline-powered boiler to produce the steam as well as a condenser to recycle spent steam.

1 Claim, 1 Drawing Sheet

A - Internal Combustion Engine
B - Piston-Type Steam Engine
C - Boiler
D - Condenser
E - Fuel Tank

STEAMOLINE: A GAS-ELECTRIC-STEAM POWER HYBRID AUTOMOBILE

CROSS-REFERENCES TO RELATED APPLICATIONS n/a

STATEMENT REGARDING FEDERALLY SPONSORED RESEARCH AND DEVELOPMENT n/a

THE NAMES OF THE PARTIES TO A JOINT RESEARCH AGREEMENT n/a

INCORPORATION-BY-REFERENCE OF MATERIAL SUBMITTED ON A COMPACT DISC n/a

BACKGROUND OF THE INVENTION

1. Field of the Invention

The present invention is in the field of vehicular power plants and more specifically in the field of automobiles. It is a type of automotive quite similar to that currently manufactured by American automotive infrastructure. The information known is that there is an ubiquitous presence of the gasoline-powered automobile in the United States. By improving the efficiency by which automotive vehicles burn gasoline, exhaust gas emissions can be reduced and fuel supply increased. It is toward this problem that this invention is oriented. However, it has the potential for significantly increased fuel efficiency, reduced emissions, and perhaps most importantly, is very easily manufactured within the current scope of the American automotive manufacturing industry. It accomplishes this by pairing an internal combustion gasoline engine with a steam engine.

2. The Prior Art

The current automobile produced in America today is powered by an internal combustion engine. Many such average size automobiles seem to be able to only realize a fuel efficiency of roughly 30 miles per gallon of gasoline. There are attempts to manufacture alternative fuel vehicles capable of realizing greater fuel efficiency. Recently, there has been an idea to hybridize the gasoline-powered automotive vehicle with an electric motor. Most promising among these is the gas-electric hybrid as exemplified by the Toyota Prius. These vehicles can achieve higher fuel efficiency. However, the main drawback right now is the prohibitive cost of the battery packs necessary to drive their electric motors. There are also fuel-cell vehicles being developed as well as electric vehicles. However, these too have significant logistical problems that must be overcome. Electric vehicles must be charged for long periods of time and driven only for somewhat short distances. Fuel cell vehicles pose a somewhat greater hazard due to the inherent properties of hydrogen fuel. The object of this invention is to continue along the thought processes of these two aforementioned innovations. What this invention adds is the utilization of steam power. This will be accomplished by the manufacture of an automotive vehicle which delivers improves upon the already superior fuel efficiency and reduced carbon emissions of the "gasoline-electric" hybrid already realized.

In the prior art, one finds vehicles which, when put simply, have engines connected to drivetrains, connected to axles, connected to wheels. These vehicles also have fuel tanks and means of delivering fuel to engines. Many have transmissions placed between engines and drivetrains to optimize power delivery to the wheels. Attempts at improving fuel economy in such vehicles has recently focused on building vehicles which use both an internal combustion engine and an electric motor to power the vehicle.

The present invention circumvents the challenges presented by the prior paths pursued. It accomplishes this by utilizing a standard internal combustion engine as well as a piston-type steam engine to produce the motive force necessary to power the vehicle. It uses the internal combustion engine primarily to start the vehicle from cold, and uses the piston-type steam engine to power the vehicle after it has warmed up. By so doing, fuel efficiency can be theoretically doubled, emissions halved, manufacture costs only marginally increased, and the current American automotive infrastructure reinvigorated with an automotive which can quickly and easily be introduced to the public.

In U.S. Pat. No. 5,385,211 issued Jan. 31, 1995 to Carroll there is a vehicle powered by an electric drivetrain with steam and internal combustion engines recharging the battery packs. The present invention improves upon the prior art by eliminating the need for expensive battery packs. It requires the current setup of the internal combustion engine automobile paired with a steam engine under the hood. The electric component of the invention is that already present in the current art. The present invention incorporates a piston-type steam engine as a primary producer of motive force.

BRIEF SUMMARY OF THE INVENTION

The present invention provides an automobile powered by both an internal combustion engine and a piston-type steam engine connected to a drivetrain, with a self-contained boiler to generate the needed necessary steam. Upon starting the vehicle, the internal combustion engine powers the vehicle much like the present prior art. Simultaneously, additional gasoline is combusted in the self-contained boiler apparatus. Initially, fuel consumption is marginally higher than that found in the prior art. However, after a few minutes of driving operation, the required steam pressure is reached in the boiler apparatus to operate the piston-type steam engine and provide additional motive force without the concurrent operation of the internal combustion engine. This allows for the cessation of the operation of the internal combustion engine for the remainder of the trip. The piston-type steam engine is then capable of powering the vehicle independently for the remainder of the trip. Since the thermal efficiency of the steam engine is superior to that of the internal combustion engine, and since it is utilized for the majority of the trip, less fuel is consumed and overall fuel efficiency is increased.

BRIEF DESCRIPTION OF THE DRAWING

One preferred embodiment is shown in the drawing, FIG. 1. The drawing shows a skeletal outline of the automobile. It contains an internal combustion engine as shown by 'A'. It also contains an old-fashioned, conventional, piston-type steam engine as shown by 'B'. There is a self-contained boiler as shown by 'C'. The boiler and internal combustion engine are powered by fuel from the fuel tank labeled as 'E'. There is also a condenser labeled as 'D'. It also shows the vehicle's drivetrain, labeled as 'F'.

DETAILED DESCRIPTION OF THE INVENTION

Figure 1:
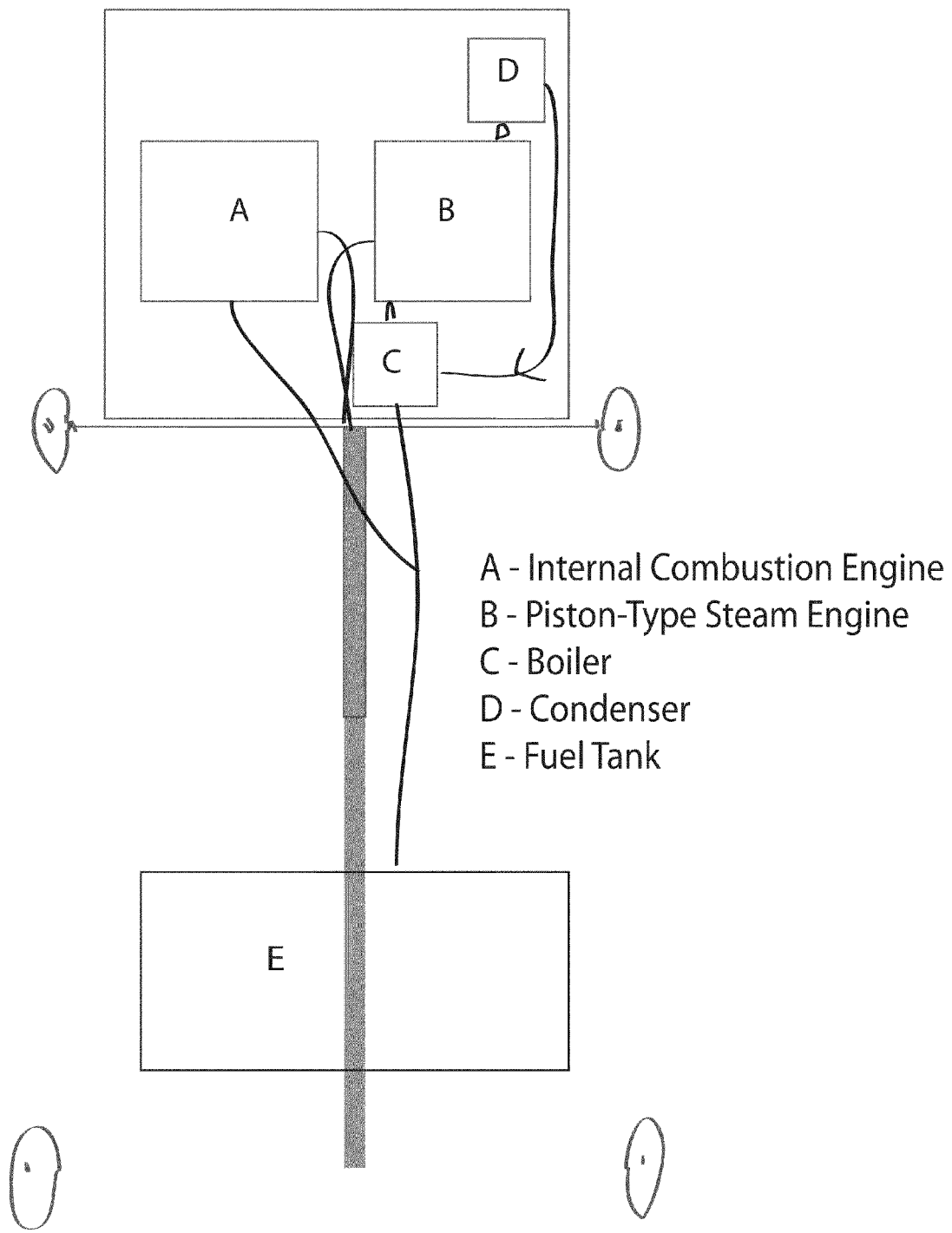

The envisioned automobile is powered by a combination of the external combustion steam engine utilized in the earliest automobiles, a gasoline-powered boiler, and the gasoline-powered automobile setup. Much like the current mass-produced automobile, the preferred embodiment of the gas-steam powered hybrid automobile contains an internal combustion engine. This engine gets gasoline from the fuel tank. In the preferred embodiment of this automobile, there is also a piston-type steam engine connected to a drivetrain. The piston-type steam engine is powered by steam generated by a boiler. The boiler is powered by the same fuel as is the internal combustion engine. Spent steam from the steam engine goes through a condenser and is recycled back into the boiler. Upon starting the vehicle, the necessary steam pressure is not yet attained, so the automotive vehicle operates entirely from power delivered to the drivetrain from the standard internal combustion engine. However, after a few minutes, the self-contained boiler has attained adequate steam pressure and the steam engine is capable of powering the vehicle without the concurrent operation of the internal combustion engine. In the preferred embodiment, fuel efficiency can be theoretically doubled relative to that of the current internal combustion automobile. What is new is the addition of a steam engine as the primary producer of motive force. This is an improvement over the tried-and-true predecessor automobile.

In its essence, this improvement retains the vast majority of technical features of the current state of the automotive art. As is found in the prior art, this vehicle contains a drivetrain. It also contains engines to provide motive force. It reshuffles the power sources however. The envisioned vehicle is what can be thought of as a 'gas-steam' hybrid automotive vehicle. The instant invention provides for an automotive vehicle powered by both an internal combustion engine and a piston-type steam engine. The internal combustion engine is utilized to start the vehicle from cold and thereafter the steam engine powers the vehicle for the duration of the trip. In the preferred embodiment, the operation of the internal combustion engine ceases upon the attainment of adequate steam pressure in the boiler apparatus, and the vehicle is then capable of being powered independently by the steam engine without the concurrent operation of the internal combustion engine.

Although the description above contains many specificities, these should not be construed as limiting the scope of the embodiments but as merely providing illustrations of some of several embodiments. Thus the scope of the embodiments should be determined by the appended claims and their legal equivalents, rather than by the examples given.

The invention claimed is:

1. A more fuel-efficient automotive vehicle comprising:
   (a) an internal combustion engine powered directly by gasoline,
   (b) a piston-type steam engine powered indirectly by gasoline,
   (c) with both said piston-type steam engine and said internal combustion engine connected to a drivetrain,
   (d) a self-contained gasoline-powered boiler to produce the necessary steam,
   (e) a condenser to recycle the spent steam from the piston-type steam engine,
   (f) said internal combustion engine and said boiler receive combustible fuel from the fuel tank,
   (g) said piston-type steam engine receives steam from the boiler,
   (h) said boiler generates steam by the direct combustion of gasoline within the boiler apparatus to heat water and thus generate steam,
   (i) said piston-type steam engine is capable of transmitting force directly to a drivetrain and thus powering the vehicle alone after a warm-up period without the concurrent operation of the internal combustion engine,
   (j) said internal combustion engine burns fuel and transmits power to a drivetrain to power the vehicle upon starting from cold,
   (k) wherein after adequate steam pressure has been attained in the directly gasoline-powered boiler apparatus, operation of the internal combustion engine ceases and the piston-type steam engine is able to power the vehicle alone independently for the remainder of the trip,
   (l) wherein the relatively superior power and thermal efficiency of the steam engine as compared to the internal combustion engine allows for augmented overall fuel efficiency and reduced emissions.

* * * * *